United States Patent
Shinohara

(10) Patent No.: US 9,627,998 B2
(45) Date of Patent: Apr. 18, 2017

(54) ELECTRIC MOTOR CONTROL DEVICE

(71) Applicant: Mitsubishi Electric Corporation, Tokyo (JP)

(72) Inventor: Ryo Shinohara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/962,539

(22) Filed: Dec. 8, 2015

(65) Prior Publication Data

US 2016/0248347 A1  Aug. 25, 2016

(30) Foreign Application Priority Data

Feb. 24, 2015  (JP) .................................. 2015-033614

(51) Int. Cl.
| | | |
|---|---|---|
| *H02P 6/14* | (2016.01) | |
| *H02P 3/12* | (2006.01) | |
| *H02P 3/14* | (2006.01) | |

(52) U.S. Cl.
CPC .................. *H02P 3/12* (2013.01); *H02P 3/14* (2013.01); *H02P 6/14* (2013.01)

(58) Field of Classification Search
CPC ........ H02P 27/06; H02P 29/032; H02P 6/182; H02M 7/525
See application file for complete search history.

(56) References Cited

U.S. PATENT DOCUMENTS

| 2006/0181235 A1 | 8/2006 | Imaie et al. |
| 2010/0013422 A1* | 1/2010 | Ikei .................. H02P 6/182 |
| | | 318/400.13 |

FOREIGN PATENT DOCUMENTS

| JP | 9-121561 A | 5/1997 |
| JP | 2005-102410 A | 4/2005 |
| JP | 2006-230084 A | 8/2006 |

OTHER PUBLICATIONS

Japanese Office Action for JP 2015-033614 dated Sep. 8, 2015.

* cited by examiner

*Primary Examiner* — Karen Masih
(74) *Attorney, Agent, or Firm* — Sughrue Mion, PLLC; Richard C. Turner

(57) ABSTRACT

The electric motor control device includes: an inverter circuit 20 which converts DC power of a DC power supply 90 into AC power; and a switching control section 60 which performs on/off control of a semiconductor switching element composing the inverter circuit. The switching control section 60 includes: a power-supply-side abnormality determination section 62 which determines whether a power-supply-side abnormal state is established in which regenerative energy from an electric motor 10 cannot be regenerated to the DC power supply; and a switching frequency changeable section 63 which changes, when the power-supply-side abnormality determination section has determined that the power-supply-side abnormal state has been established, a switching frequency of the semiconductor switching element such that an overall loss, which is a total of loss in the inverter and loss in the electric motor, is increased.

10 Claims, 4 Drawing Sheets

ELECTRIC MOTOR CONTROL DEVICE

BACKGROUND OF THE INVENTION

1. Field of the Invention

The present invention relates to an electric motor control device which performs drive control for an AC electric motor.

2. Description of the Background Art

Conventionally, electric vehicles are known that use, as a driving force source, an AC electric motor which performs power running operation to generate a travel driving torque during traveling and which performs regenerative operation to generate a regenerative braking torque during braking operation.

In an electric vehicle drive system, a DC power supply implemented by a secondary battery such as a lithium ion battery is connected to an inverter composed of a capacitor and a plurality of semiconductor switches, and to this inverter, an AC electric motor is connected as a load. The inverter turns on and off the plurality of semiconductor switches at a predetermined switching frequency, to convert DC power of the DC power supply into predetermined AC power, thereby adjusting the torque or rotation rate of the AC electric motor which is a load. As the AC electric motor to be used in an electric vehicle, a permanent magnet synchronous electric motor which is efficient is often used. Depending on the operation state, the AC electric motor operates as an electric generator and charges the DC power supply with regenerative power generated through the power generation.

The operation principle of the inverter is well known and is not explained here.

In the electric vehicle drive system, in order to protect the battery being the DC power supply from overvoltage and overcurrent, a switch section which disconnects the battery from the inverter as necessary is provided. Examples of opening conditions for the switch section include that the voltage of the battery has become greater than or equal to a predetermined value during regenerative operation of the electric motor, that the voltage of the battery has become less than or equal to a predetermined value due to consumption of the battery, and that current flowing in the battery has become greater than or equal to a predetermined value.

In such a system, there are cases where the switch section is opened during regenerative operation of the electric motor, to be disconnected from the DC power supply. Moreover, even in the case of a system not including the switch section, there are cases where the DC power supply is disconnected from the inverter due to breakage of the power line between the DC power supply and the inverter. In such cases, the regenerative power flowing from the electric motor into the inverter cannot be charged to the battery, and instead, is charged to the capacitor in the inverter. This may cause overvoltage in the capacitor, resulting in damage of the capacitor.

As a countermeasure to this, there is a technique in which when the inverter is disconnected from the DC power supply, all semiconductor switches in the inverter are turned off to stop operation of the inverter, thereby stopping regenerative operation of the AC electric motor. However, with this technique, the regenerative braking torque of the electric motor is suddenly reduced, and the regenerative braking of the vehicle is suddenly disabled. This significantly lowers the operability for the driver. In addition, when the operation of the inverter is suddenly stopped, an excessive surge current may flow into the inverter due to induced voltage of the electric motor. This may damage the semiconductor switches and the like.

As another countermeasure, there is a technique of additionally providing a discharge circuit in which regenerative power flowing from the electric motor into the inverter is consumed through heat generation, whereby excessive regenerative power flowing into the capacitor is consumed in the discharge circuit. However, with this technique, since the discharge circuit is additionally provided, the size of the inverter is increased. In particular, if a large amount of regenerative power is to be consumed in the discharge circuit, the discharge circuit needs to be configured, using an element having a large withstand power. This may become an obstacle in realization of downsizing and low cost of the inverter. For an inverter of electric vehicle that needs to be disposed in limited space in the vehicle, the presence of the obstacle in downsizing thereof poses a significant problem.

This problem can be addressed by a technique of reducing the regenerative power to be flowed to the DC power supply side. As the technique, Japanese Laid-Open Patent Publication No. 9-121561 discloses a method for processing regenerative power for the inverter characterized in that: the switching frequency of the inverter is controlled so as to be changed in accordance with variation in DC voltage due to regenerative power; and the regenerative power is consumed by switching loss in switching elements of the inverter.

With this technique, if regenerative power is increased, the switching frequency of the inverter is increased in accordance with the increase thereof, to increase the switching loss. Then, the regenerative power is consumed through the switching loss, thereby realizing a small inverter in which a regenerative power consuming component such as a discharge circuit can be omitted.

However, with the approach disclosed in Japanese Laid-Open Patent Publication No. 9-121561, when regenerative power has been increased, the switching frequency is increased with only the switching loss taken into consideration, and a property that the loss in the electric motor is dependent on the switching frequency is not taken into consideration. Accordingly, the regenerative power cannot be effectively consumed through losses in the inverter and the electric motor.

Specifically, in a switching frequency range often employed in an inverter for electric vehicle, it is general that, if the switching frequency is increased, the inverter efficiency is reduced and the electric motor efficiency is increased as shown in FIG. 3. The overall efficiency in total is not necessarily reduced even if the switching frequency is increased. That is, there are cases where the overall loss is decreased when the switching frequency is increased. In such a case, if the switching frequency is increased such that the switching loss is increased, regenerative power to be consumed in the inverter and the electric motor will be decreased. As a result, regenerative power to be flowed to the DC power supply side is increased. Thus, this technique poses a problem that downsizing of the inverter cannot be realized.

SUMMARY OF THE INVENTION

The present invention has been made in order to solve the above problems. An object of the present invention is to provide an electric motor control device which prevents DC bus voltage from becoming overvoltage without stopping regenerative operation even in a state where the inverter cannot regenerate power to the DC power supply.

An electric motor control device according to the present invention is for controlling drive and regenerative operation of an electric motor, and includes: an inverter circuit which converts DC power of a DC power supply into AC power; and a switching control section which performs on/off control of a semiconductor switching element composing the inverter circuit. In the electric motor control device, the switching control section includes: a power-supply-side abnormality determination section which determines whether a power-supply-side abnormal state is established in which regenerative energy from the electric motor cannot be regenerated to the DC power supply; and a switching frequency changeable section which changes, when the power-supply-side abnormality determination section has determined that the power-supply-side abnormal state has been established, a switching frequency of the semiconductor switching element such that an overall loss, which is a total of loss in the inverter circuit and loss in the electric motor, is increased.

With the configuration according to the present invention, it is possible to provide a small-sized electric motor control device at low cost which prevents DC bus voltage from becoming overvoltage without stopping regenerative operation even in a state where the inverter circuit cannot regenerate power to the DC power supply.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

In general, an electric motor (motor) performs power running operation by converting power into driving force, but can perform regenerative operation by inversely converting driving force into power, with the structure thereof unchanged. An electric generator (generator) generates power by converting driving force into power, but can perform power running operation by inversely converting power into driving force, with the structure thereof unchanged. That is, an electric motor and an electric generator basically have an identical structure and both can perform power running operation and regenerative operation. Herein, a rotary electric machine having both functions of an electric motor and an electric generator will be simply referred to as an electric motor.

FIRST EMBODIMENT

Hereinafter, an electric motor control device according to a first embodiment of the present invention will be described in detail with reference to FIG. 1 to FIG. 3.

Figure 1:
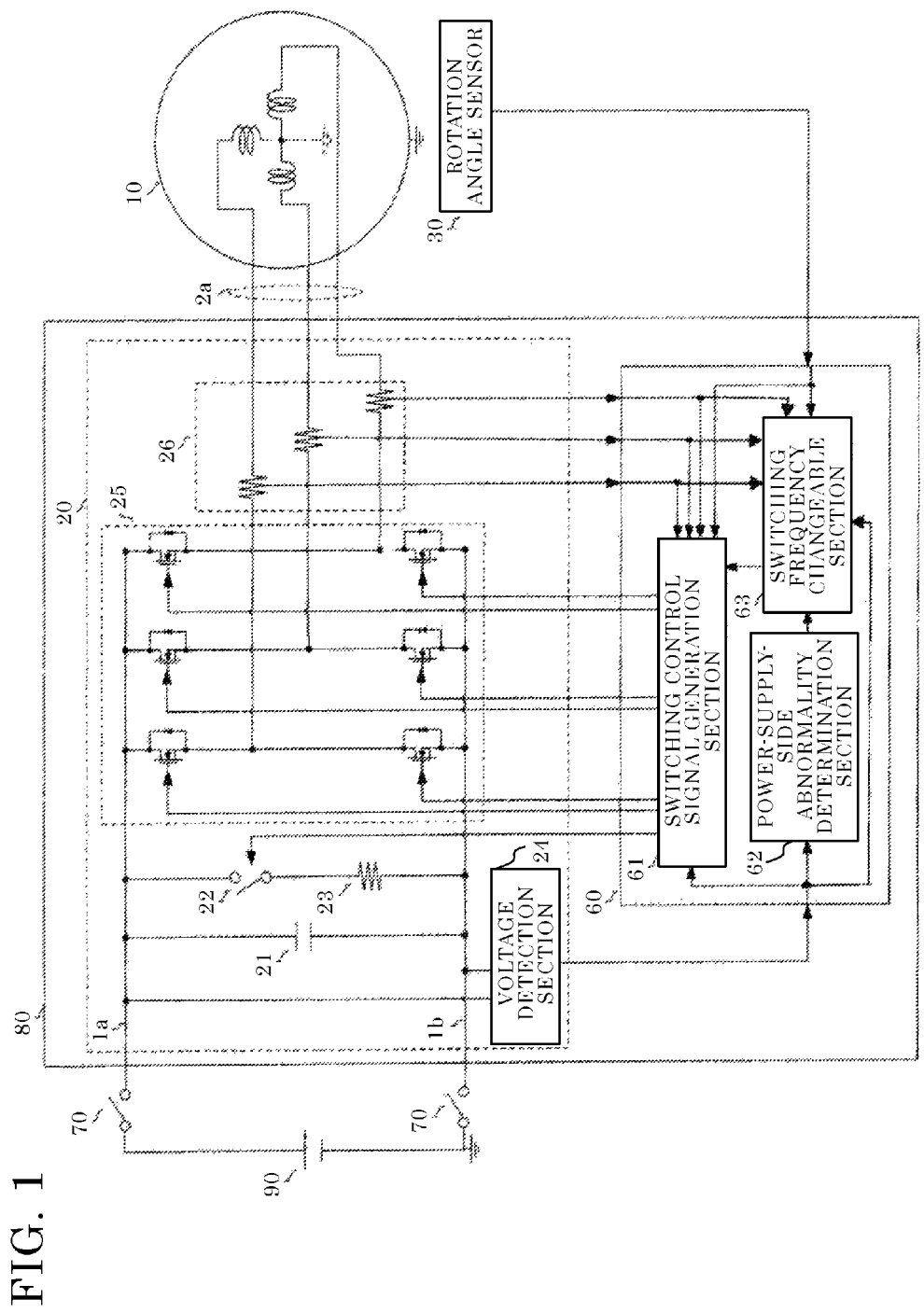
FIG. 1 is a system configuration diagram showing a configuration of an electric motor control device according to a first embodiment of the present invention.
Figure 2:
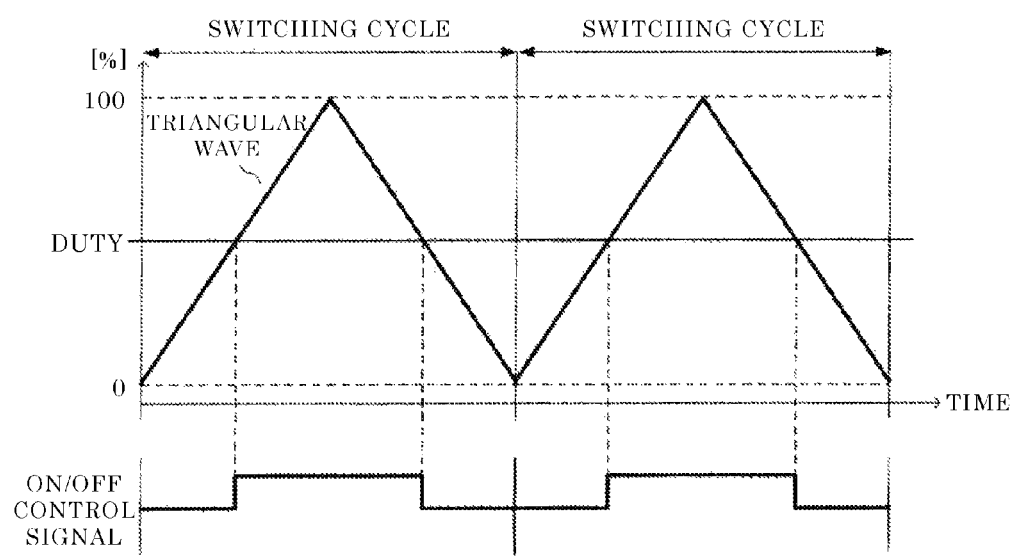
FIG. 2 is a diagram for explaining how to generate a switching control signal for an inverter circuit according to a triangular wave comparison method.

FIG. 1 is a system configuration diagram of the electric motor control device in the first embodiment. For convenience of explanation, FIG. 1 also shows a three-phase AC electric motor to be controlled, and a DC power supply, such as a battery, which supplies DC power to an inverter circuit and which is charged with regenerative power.

In FIG. 1, an electric motor control device 80 is connected to a DC power supply 90 by means of DC buses 1$a$ and 1$b$ via power switches 70, and receives driving power from the DC power supply 90 and supplies regenerative power to the DC power supply 90. Also, the electric motor control device 80 is connected to an electric motor 10 by means of AC buses 2$a$, and receives regenerative power from the electric motor 10 and supplies driving power to the electric motor 10. The electric motor 10 includes a rotation angle sensor 30 which detects the rotation angle of the electric motor.

The electric motor 10 is an electric motor which can drive a load so as to rotate and which can regenerate the rotational energy of the load into electric energy. As the electric motor 10, a permanent magnet three-phase AC synchronous motor or a three-phase brushless motor is used.

The electric motor control device 80 is composed of an inverter circuit 20 and a switching control section 60. The inverter circuit 20 includes: a capacitor 21 connected between the DC buses 1$a$ and 1$b$ on the power supply input side; a discharge circuit which is composed of a discharge switch 22 and a discharge resistor 23 connected to each other in series, and which is connected in parallel to the capacitor 21; a voltage detection section 24 which detects DC bus voltage of the inverter circuit 20; a power conversion circuit 25 which is composed of a plurality of switching elements and which performs DC/AC power conversion; and an electric motor current detection section 26 which detects the value of current, of the electric motor 10, flowing in each AC bus 2$a$.

The switching control section 60 performs overall control of the electric motor control device. The switching control section 60 includes: a switching control signal generation section 61 which performs on/off control of the plurality of switching elements composing the power conversion circuit 25; a power-supply-side abnormality determination section 62 which determines whether a power-supply-side abnormal state is established in which regenerative power cannot be regenerated to the DC power supply 90; and a switching frequency changeable section 63 which changes, when the power-supply-side abnormality determination section 62 has determined that the power-supply-side abnormal state has been established, the switching frequency of each semiconductor switching element such that the overall loss, which is the total of the loss in the inverter circuit 20 and the loss in the electric motor 10, is increased.

The switching control signal generation section 61 of the switching control section 60 is composed of a microcontroller, a drive circuit, and the like. The switching control signal generation section 61 receives DC bus voltage information from the voltage detection section 24, rotation angle information of the electric motor 10 from the rotation angle sensor 30, electric motor current information from the electric motor current detection section 26, and switching frequency information from the switching frequency changeable section 63. Based on these pieces of received information and a command value inputted from outside (not shown), the switching control signal generation section 61 calculates an on/off control signal for each switching element of the power conversion circuit 25, and outputs the on/off control signals to the power conversion circuit 25.

Each power switch 70 controls power reception/supply between the electric motor control device 80 and the DC power supply 90. When voltage of the DC power supply 90 has become greater than or equal to a predetermined value during regenerative operation of the electric motor 10, when voltage of the DC power supply 90 has become less than or equal to a predetermined value due to consumption or the like of the DC power supply 90, when current flowing in the DC power supply 90 has become greater than or equal to a predetermined value, or the like, the power switch 70 is controlled to be opened by a superordinate system not shown. There is no problem if the power switch 70 is configured to be controlled by the switching control section 60.

The capacitor 21 of the inverter circuit 20 has a function of suppressing ripples of DC bus voltage, a function of reducing source impedance of the inverter circuit 20 to improve AC current driving ability of the inverter circuit 20, a function of absorbing surge voltage, and the like.

A major function of the discharge switch 22 of the inverter circuit 20 is to form, when DC bus voltage has become greater than or equal to a predetermined voltage while the power switch 70 is in the open state, a path for discharging power accumulated in the capacitor 21 and regenerative power coming from the electric motor 10.

In FIG. 1, the switching control section 60 determines whether DC bus voltage inputted from the voltage detection section 24 is greater than or equal to a predetermined value. When the DC bus voltage is greater than or equal to the predetermined value, the switching control section 60 outputs a control signal so as to turn on the discharge switch 22, whereby the discharge switch 22 is turned on, and energy accumulated in the capacitor 21 is consumed by the discharge resistor 23. Examples of the method for turning on/off the discharge switch 22 include: a method in which the turning on/off is controlled by a microcontroller included in the switching control section 60; a method in which determination is performed on DC bus voltage by a comparison circuit or the like and the discharge switch 22 is turned on/off only by use of the circuit; and the like. Alternatively, a constant voltage element such as a varistor or a Zener diode may be used instead of the discharge switch 22 and the discharge resistor 23.

The voltage detection section 24 divides DC bus voltage by use of a voltage dividing resistor or the like into voltage that can be read by the switching control section 60, and outputs DC bus voltage information to the switching control section 60.

The electric motor current detection section 26 detects the electric motor current value flowing in each AC bus 2a, and converts the current value into voltage to output the voltage to the switching control section 60. FIG. 1 shows a configuration in which the current value is detected by a shunt resistor. The electric motor current detection section 26 may be a current sensor using a Hall element or the like.

The rotation angle sensor 30 detects the rotor rotation angle of the electric motor 10 by means of a resolver, an encoder, or the like. The detected rotor rotation angle is outputted to the switching control section 60.

The power conversion circuit 25 is an inverter in which six switching elements are connected in full-bridge configuration.

Each switching element of the power conversion circuit 25 shown in FIG. 1 is a MOSFET being a type of a field-effect transistor. However, another type of transistor, an IGBT, or the like may be used. By being driven by the control signals from the switching control signal generation section 61 of the switching control section 60, these switching elements perform on/off operation, to convert DC power into AC power and supply the AC power to the electric motor 10, and to charge the DC power supply 90 with regenerative power generated by the electric motor 10 in a regenerative state.

Each on/off control signal from the switching control signal generation section 61 is a PWM signal in general, and as a generation method therefor, a triangular wave comparison method is typically used. The triangular wave comparison method is a well-known technique and is briefly explained with reference to FIG. 2 here. First, a triangular wave signal having a frequency corresponding to the switching frequency is generated. Next, based on a command value from outside, a duty that allows the inverter to output a desired voltage is calculated. Then, the magnitudes of the triangular wave signal and the duty are compared with each other, and by switching on/off in accordance with the magnitude relationship, a PWM signal corresponding to the duty can be generated. The method for calculating the duty is generally known for driving an inverter, and thus, is not explained here.

Further, the power-supply-side abnormality determination section 62 of the switching control section 60 determines whether the power-supply-side abnormal state is established based on the DC bus voltage information inputted from the voltage detection section 24, and outputs the determination result to the switching frequency changeable section 63. The switching frequency changeable section 63 receives the DC bus voltage information from the voltage detection section 24, the rotation angle information of the electric motor from the rotation angle sensor 30, the electric motor current information from the electric motor current detection section 26, and the determination result regarding the power-supply-side abnormal state from the power-supply-side abnormality determination section 62. The switching frequency changeable section 63 sets a switching frequency based on these pieces of received information, and outputs the switching frequency to the switching control signal generation section 61.

Next, operation of the electric motor control device in the first embodiment of the present invention will be described.

First, based on the DC bus voltage value inputted from the voltage detection section 24, the power-supply-side abnormality determination section 62 determines whether regenerative power cannot be regenerated to the DC power supply 90. Specifically, in the case where the DC bus voltage is greater than or equal to a predetermined value, the power-supply-side abnormality determination section 62 determines that the power-supply-side abnormal state is established in which regenerative power cannot be regenerated to the DC power supply 90. In other cases than the above, the power-supply-side abnormality determination section 62 determines that a power-supply-side normal state is established. Thus, the power-supply-side abnormality determination section 62 can determine that the power-supply-side abnormal state is established when regenerative power cannot be regenerated to the DC power supply 90, such as: when by the electric motor 10 performing regenerative operation while the power switch 70 is in the open state, regenerative power is accumulated in the capacitor 21, and voltage across both ends of the capacitor 21, i.e., DC bus voltage, has become overvoltage; or when the DC power supply 90 is in an overcharge state even if the power switch 70 is in continuity.

When the power-supply-side abnormality determination section 62 has determined that the power-supply-side normal state has been established, this is a state where the electric motor 10 can perform power running operation and regenerative operation without any problem, and the switching frequency changeable section 63 sets a predetermined switching frequency by a conventional method. In general, the switching frequency is determined in consideration of loss, control responsibility, noise, electromagnetic noise, and the like. As basic methods for determining the switching frequency, there are a non-synchronous type in which a previously-set constant switching frequency is employed, and a synchronous type in which the switching frequency is always changed in proportion to the rotation speed of the electric motor. Then, the switching control signal generation section 61 receives the switching frequency set by the switching frequency changeable section 63, generates a PWM control signal corresponding to this switching frequency by the triangular wave comparison method, and causes each switching element of the power conversion circuit 25 to perform on/off operation.

When the power-supply-side abnormality determination section 62 has determined that the power-supply-side abnormal state has been established, this is a state where regenerative power cannot be regenerated to the DC power supply 90. Thus, the switching frequency changeable section 63 selects a switching frequency that increases the overall loss of the electric motor 10 and the power conversion circuit 25 by a method described later. Then, the switching control signal generation section 61 receives the switching frequency set by the switching frequency changeable section 63, generates a PWM control signal corresponding to this switching frequency by the triangular wave comparison method, and causes each switching element of the power conversion circuit 25 to perform on/off operation. Accordingly, the amount of regenerative power to the input side of the power conversion circuit 25 can be reduced.

Hereinafter, a switching frequency setting method performed by the switching frequency changeable section 63 when it has been determined that the power-supply-side abnormal state has been established will be described in detail.

The switching frequency changeable section 63 has previously stored, in a memory, a maximum loss switching frequency which causes a worst overall loss, in association with the rotation speed of the electric motor 10. For example, the maximum loss switching frequency corresponding to the rotation speed of the electric motor 10 is stored in the memory as a two-dimensional map. Then, the switching frequency changeable section 63 calculates the rotation speed of the electric motor 10 based on the rotation angle of the electric motor 10 inputted from the rotation angle sensor 30, and sets a maximum loss switching frequency that corresponds to this rotation speed of the electric motor 10, with reference to the two-dimensional map mentioned above.

It is noted that the maximum loss switching frequency previously stored is set within a frequency range in which the electric motor control device 80 can normally drive the electric motor 10. That is, the maximum loss switching frequency is set within a switching frequency range in which the electric motor control device 80 and the electric motor 10 do not cause thermal runaway due to heat generation, and can drive at the performance of the switching elements that are used, the calculation load of the microcontroller does not become overload, and the electric motor 10 can be normally controlled without causing oscillation or torque pulsation. In particular, it is generally known that the lower limit value, of the switching frequency, that is necessary for normal control of the electric motor 10 is in proportion to the rotation speed of the electric motor 10. Thus, the lower limit value in the switching frequency range is set in consideration of the rotation speed of the electric motor 10.

Through the operation described above, based on the DC bus voltage, it is determined whether the state where regenerative power cannot be regenerated to the DC power supply 90 is established. Then, when the state where regenerative power cannot be regenerated to the DC power supply 90 is established, a switching frequency that maximizes the overall loss is set in accordance with the rotation speed of the electric motor 10, thereby causing each switching element to perform on/off operation. Thus, when regenerative power cannot be regenerated to the DC power supply 90, the overall loss can be maximized within a range that allows normal control of the electric motor 10, whereby regenerative power to the power supply input side can be reduced.

According to the first embodiment described above, when regenerative power cannot be regenerated to the DC power supply 90, the switching frequency of each semiconductor switching element is changed such that the overall loss, which is the total of the loss in the inverter and the loss in the electric motor, is increased. Accordingly, regenerative power to the power supply input side is reduced, and thus, small-sized elements having a comparatively small capacitance/withstanding voltage can be employed as the capacitor 21 and the discharge circuit (the series circuit of the discharge switch 22 and the discharge resistor 23). In addition, a small-sized electric motor control device can be realized that is not damaged even when the inverter circuit 20 is disconnected from the DC power supply 90 during regenerative operation.

In the first embodiment, the switching frequency changeable section 63 has previously stored, in a memory, the maximum loss switching frequency in association with the rotation speed of the electric motor 10. However, since the overall loss changes also due to the current flowing in the inverter circuit 20 and the electric motor 10, the maximum loss switching frequency may be previously stored in the memory in association with the rotation speed and the electric motor current value of the electric motor 10. For example, the maximum loss switching frequency corresponding to the rotation speed and the effective value of the electric motor current of the electric motor is stored in the memory as a three-dimensional map. Then, the rotation speed of the electric motor 10 is calculated based on the rotation angle of the electric motor 10 inputted from the rotation angle sensor 30, the effective value of the electric motor current is calculated based on the current value inputted from the electric motor current detection section 26, and then, a maximum loss switching frequency that corresponds to this rotation speed and this effective value of the electric motor current of the electric motor 10 is set with reference to the three-dimensional map mentioned above. Accordingly, the switching frequency can be set based on overall loss information that more matches the operation state of the electric motor control device, and thus, regenerative power can be more effectively consumed. Alternatively, the maximum loss switching frequency may be previously stored in the memory only in association with the electric motor current value, instead of being stored in the memory in association with the rotation speed and the electric motor current value of the electric motor 10.

Further, since the overall loss changes also due to the DC bus voltage, the maximum loss switching frequency may be previously stored in the memory in association with the DC bus voltage, and the rotation speed and the electric motor current value of the electric motor 10. For example, a plurality of three-dimensional maps of the maximum loss switching frequency corresponding to the rotation speed and the effective value of the electric motor current of the electric motor 10 are stored in association with the magnitude of the DC bus voltage. Then, a three-dimensional map to be used is selected based on the DC bus voltage inputted from the voltage detection section 24. Then, the rotation speed of the electric motor 10 is calculated based on the rotation angle of the electric motor 10 inputted from the rotation angle sensor 30, the effective value of the electric motor current is calculated based on the current value inputted from the electric motor current detection section 26, and then, a maximum loss switching frequency that corresponds to this rotation speed and this effective value of the electric motor current of the electric motor 10 is set, by referring to the three-dimensional map mentioned above and in accordance with the magnitude of the DC bus voltage. Accordingly, a switching frequency can be set based on overall loss information that more matches the operation state of the electric motor control device, and thus, regenerative power can be more effectively consumed. Alternatively, the maximum loss switching frequency may be previously stored in the memory only in association with the DC bus voltage, or may be previously stored in the memory in association with the DC bus voltage and the rotation speed of the electric motor 10, or may be previously stored in the memory in association with the DC bus voltage and the effective value of the electric motor current, instead of being stored in the memory in association with the DC bus voltage, and the rotation speed and the electric motor current value of the electric motor 10.

As the switching element for the power conversion circuit 25, any element may be used, but a wide band gap semiconductor can be used, for example. Examples of the wide band gap semiconductor include a wide band gap semiconductor that is formed from diamond, a silicon carbide-based material, a gallium nitride-based material, or the like. An inverter (hereinafter, referred to as wide band gap inverter) composed of switching elements formed of such wide band gap semiconductors causes low loss and can be driven at high frequency, when compared with a conventional inverter (hereinafter, referred to as Si inverter) composed of switching elements each formed from Si (silicon).

Therefore, in an electric motor control device using the wide band gap inverter, the proportion of the loss in the electric motor to the overall loss is increased, when compared with that in an electric motor control device using the Si inverter. Thus, in the case of the electric motor control device using the wide band gap inverter, it is more necessary to take into consideration the overall loss combining the loss in the inverter and the loss in the electric motor, instead of taking into consideration only the loss in the inverter. Thus, by applying the technology of the present invention thereto, regenerative power can be more effectively consumed also in the wide band gap inverter.

SECOND EMBODIMENT

Figure 4:
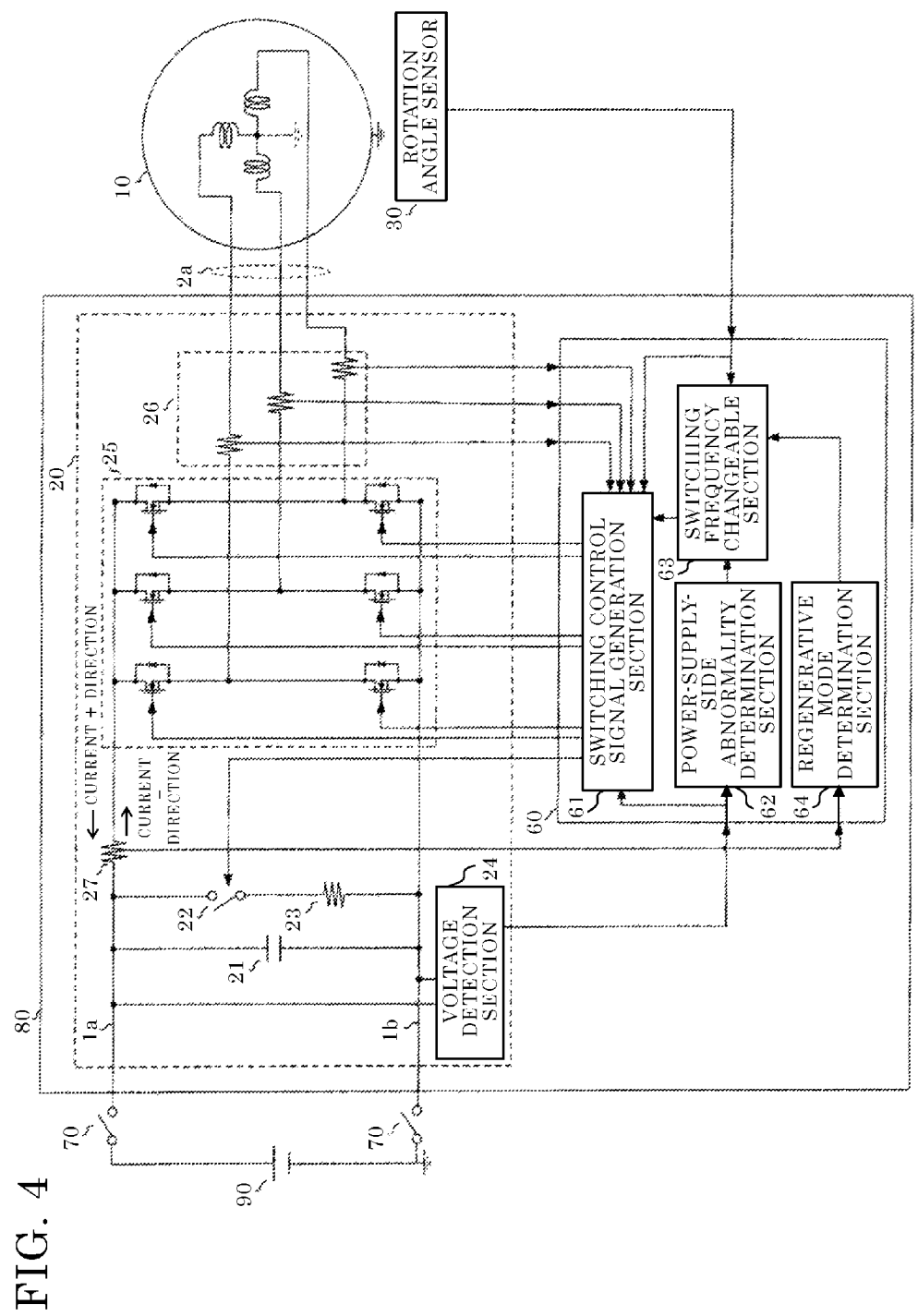
FIG. 4 is a system configuration diagram showing a configuration of an electric motor control device according to a second embodiment of the present invention.

Next, an electric motor control device according to a second embodiment of the present invention will be described in detail with reference to FIG. 4. FIG. 4 is a system configuration diagram of an electric motor control device in the second embodiment. For convenience of explanation, FIG. 4 also shows a three-phase AC electric motor to be controlled, and a DC power supply, such as a battery, which supplies DC power to an inverter circuit and which is charged with regenerative power.

In FIG. 4, as in the first embodiment, the electric motor control device 80 is composed of the inverter circuit 20 and the switching control section 60, but a DC bus current detection section 27 is added to the inverter circuit 20 and a regenerative mode determination section 64 is added to the switching control section 60. Moreover, the signal to be inputted to the switching frequency changeable section 63 is slightly different from that in the first embodiment. The other configurations are the same as those in FIG. 1 of the first embodiment. Thus, the parts that are the same as or correspond to those in FIG. 1 will be denoted by the same reference characters and description thereof is omitted.

The DC bus current detection section 27 detects the DC bus current value between the DC power supply 90 and the power conversion circuit 25, and converts the current value into voltage to output the voltage to the switching control section 60. FIG. 4 shows a configuration in which the current value is detected by a shunt resistor. The DC bus current detection section 27 may be a current sensor using a Hall element or the like.

The regenerative mode determination section 64 determines whether the electric motor 10 is in the regenerative state based on DC bus current information inputted from the DC bus current detection section 27.

Then, when the power-supply-side abnormality determination section 62 has determined that the power-supply-side abnormal state has been established and the regenerative mode determination section 64 has determined that the electric motor 10 is in the regenerative state, the switching frequency changeable section 63 receives rotation angle information of the electric motor from the rotation angle sensor 30, the determination result regarding the power-supply-side abnormal state from the power-supply-side abnormality determination section 62, and the determination result regarding the regenerative mode from the regenerative mode determination section 64. Then, the switching frequency changeable section 63 sets a switching frequency of each switching element such that the overall loss, which is the total of the loss in the inverter and the loss in the electric motor, is increased, and outputs the switching frequency to the switching control signal generation section 61.

Next, operation of the electric motor control device in the second embodiment of the present invention will be described.

First, based on the DC bus voltage value inputted from the voltage detection section 24, the power-supply-side abnormality determination section 62 determines whether regenerative power cannot be regenerated to the DC power supply 90. Specifically, in the case where the DC bus voltage is greater than or equal to a predetermined value, the power-supply-side abnormality determination section 62 determines that the power-supply-side abnormal state is established in which regenerative power cannot be regenerated to the DC power supply 90. In other cases than the above, the power-supply-side abnormality determination section 62 determines that the power-supply-side normal state is established. Thus, the power-supply-side abnormality determination section 62 can determine that the power-supply-side abnormal state is established when regenerative power cannot be regenerated to the DC power supply 90, such as: when by the electric motor 10 performing regenerative operation while the power switch 70 is in the open state, regenerative power is accumulated in the capacitor 21, and voltage across both ends of the capacitor 21, i.e., DC bus voltage, has become overvoltage; or when the DC power supply 90 is in an overcharge state even if the power switch 70 is in continuity.

In addition, based on the DC bus current value inputted from the DC bus current detection section 27, the regenerative mode determination section 64 determines whether the electric motor 10 is in the regenerative state. Specifically, the positive and negative directions of the current are assumed as in FIG. 4, the regenerative mode determination section 64 determines that the regenerative state is established when the DC bus current value is positive, and determines that the power running state is established when the DC bus current value is negative.

When the power-supply-side abnormality determination section 62 has determined that the power-supply-side normal state has been established, this is a state where the electric motor 10 can perform power running operation and regenerative operation without any problem, and the switching frequency changeable section 63 sets a predetermined switching frequency by a conventional method. In general, the switching frequency is determined in consideration of loss, control responsibility, noise, electromagnetic noise, and the like. For example, a method referred to as a non-synchronous type in which a previously-set constant switching frequency is employed, or a method referred to as a synchronous type in which the switching frequency is always changed in proportion to the rotation speed of the electric motor is used. Then, the switching control signal generation section 61 receives the switching frequency set by the switching frequency changeable section 63, generates a PWM control signal corresponding to this switching frequency by the triangular wave comparison method, and causes each switching element of the power conversion circuit 25 to perform on/off operation.

When the power-supply-side abnormality determination section 62 has determined that the power-supply-side abnormal state has been established and the regenerative mode determination section 64 has determined that the power running state has been established, this is a state where power running operation of the electric motor 10 is allowed. Thus, the switching frequency changeable section 63 sets a predetermined switching frequency by a conventional method. In general, the switching frequency is determined in consideration of loss, control responsibility, noise, electromagnetic noise, and the like. For example, a method referred to as a non-synchronous type in which a previously-set constant switching frequency is employed, or a method referred to as a synchronous type in which the switching frequency is always changed in proportion to the rotation speed of the electric motor 10 is used. Then, the switching control signal generation section 61 receives the switching frequency set by the switching frequency changeable section 63, generates a PWM control signal corresponding to this switching frequency by the triangular wave comparison method, and causes each switching element of the power conversion circuit 25 to perform on/off operation.

When the power-supply-side abnormality determination section 62 has determined that the power-supply-side abnormal state has been established and the regenerative mode determination section 64 has determined that the regenerative state has been established, this is a state where regenerative power cannot be regenerated to the DC power supply 90. Thus, the switching frequency changeable section 63 selects a switching frequency that increases the overall loss of the electric motor 10 and the power conversion circuit 25 by a method described later. Then, the switching control signal generation section 61 receives the switching frequency set by the switching frequency changeable section 63, generates a PWM control signal corresponding to this switching frequency by the triangular wave comparison method, and causes each switching element of the power conversion circuit 25 to perform on/off operation. Accordingly, the amount of regenerative power to the input side of the power conversion circuit 25 can be reduced.

Hereinafter, a switching frequency setting method performed by the switching frequency changeable section 63 when the power-supply-side abnormality determination section 62 has determined that the power-supply-side abnormal state has been established and the regenerative mode determination section 64 has determined that the regenerative state has been established will be described in detail.

Figure 3:
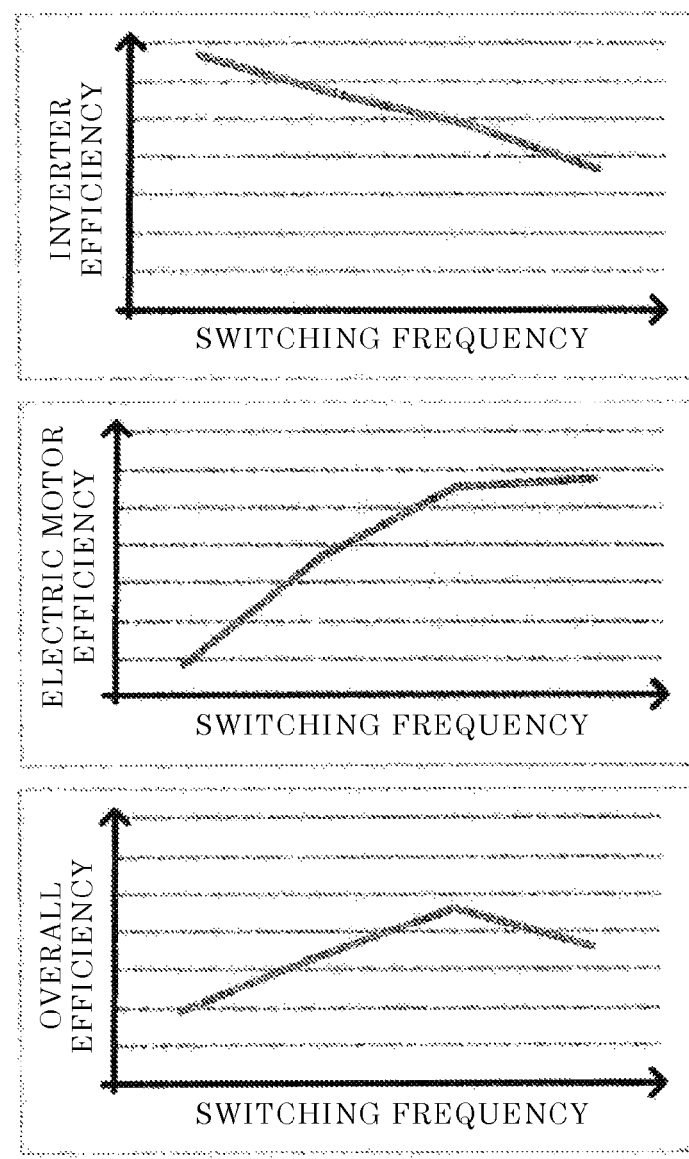
FIG. 3 shows the relationship among inverter efficiency, electric motor efficiency, overall efficiency, and switching frequency.

In general, electric motor efficiency is greatly reduced in the vicinity of the lower limit value of the switching frequency that allows normal control of the electric motor 10 as shown in FIG. 3. Generally, along with the great reduction in the electric motor efficiency, overall efficiency is also reduced in the vicinity of the lower limit value of the switching frequency. Thus, by setting the lower limit value of the switching frequency that allows normal control of the electric motor 10 as the switching frequency, the overall loss can be increased.

Specifically, based on the rotation angle of the electric motor 10 inputted from the rotation angle sensor 30, the switching frequency changeable section 63 calculates the rotation speed of the electric motor 10, and calculates, based on this rotation speed of the electric motor 10, a lower limit value of switching frequency fmin necessary for normal control of the electric motor 10 by the following expression.

$$fmin = k \times Pm \times MtrSpd/60$$

where fmin: lower limit value of switching frequency "Hz", k: constant of proportionality, Pm: pole pair number of electric motor, and MtrSpd: rotation speed of electric motor "R/MIN".

It is generally known that the constant of proportionality K is about 10. This fmin is set as the switching frequency.

Through the operation described above, based on the DC bus voltage, it is determined whether the state where regenerative power cannot be regenerated to the DC power supply 90 is established, and based on the DC bus current, it is determined whether the regenerative state of the electric motor 10 is established. Accordingly, it is possible to accurately determine whether it is the case where the overall loss needs to be increased. That is, unnecessary increase of the overall loss is prevented. In addition, when the state where regenerative power cannot be regenerated to the DC power supply 90 is established and the electric motor 10 is in the regenerative state, the lower limit value of the switching frequency that allows normal control of the electric motor 10 is set as the switching frequency, thereby causing each switching element to perform on/off operation. Thus, without requiring a memory for a map and the like, and only with simple calculation, when regenerative power cannot be regenerated to the DC power supply 90, the overall loss of regenerative power can be increased, whereby regenerative power to the power supply input side can be reduced.

According to the second embodiment described above, when regenerative power cannot be regenerated to the DC power supply 90, the switching frequency of each semiconductor switching element is changed such that the overall loss, which is the total of the loss in the inverter and the loss in the electric motor, is increased. Accordingly, regenerative power to the power supply input side is reduced, and thus, small-sized elements having a comparatively small capacitance/withstanding voltage can be employed as the capacitor 21 and the discharge circuit (the series circuit of the discharge switch 22 and the discharge resistor 23). In addition, a small-sized electric motor control device can be realized that is not damaged even when the inverter is disconnected from the DC power supply 90 during regenerative operation.

In the second embodiment, when the power-supply-side abnormality determination section 62 has determined that the power-supply-side abnormal state has been established and the regenerative mode determination section 64 has determined that the regenerative state has been established, the switching frequency changeable section 63 sets, as the switching frequency, the lower limit value of switching frequency that is necessary for normal control of the electric motor 10, but this is not essential depending on the system of the inverter and the electric motor. For example, until a certain switching frequency, the loss in the electric motor is reduced in accordance with increase in the switching frequency. However, if the switching frequency is increased beyond the certain switching frequency, the loss in the electric motor is increased. In such a high switching frequency region, the loss in the inverter and the loss in the electric motor are both increased, and thus, the overall loss is also significantly increased.

Therefore, in the case of the electric motor control device in which a high frequency switching operation is allowed, when the power-supply-side abnormality determination section 62 has determined that the power-supply-side abnormal state has been established and the regenerative mode determination section 64 has determined that the regenerative state has been established, an upper limit value of switching frequency that allows the electric motor control device 80 to operate may be set as the switching frequency. Accordingly, also in a system where the overall loss is significantly increased in a high switching frequency region, regenerative power can be effectively consumed.

It is noted that the above embodiments are merely examples and the present invention is not limited to the above embodiments as long as the present invention can be applied therein. For example, in the above embodiments, the DC power supply 90 and the electric motor control device 80 are directly connected to each other. However, a DC/DC converter which performs step-up or step-down conversion may be disposed between the DC power supply 90 and the electric motor control device 80. Alternatively, an AC power supply may be connected via an AC/DC converter or a rectifier which converts AC power of the AC power supply into DC power. In the above embodiments, an electric vehicle is used as an example to which the present invention is applied, but the present invention may be applied to a hybrid vehicle which uses both an engine and an electric motor, or further, the application of the present invention is not limited to a vehicle.

Embodiments of the present invention have been described. However, the present invention is not limited to the embodiments above and various design changes can be made. It is noted that, within the scope of the invention, the above embodiments may be freely combined with each other, or each of the above embodiments may be modified or abbreviated as appropriate.

Various modifications and alterations of this invention will be apparent to those skilled in the art without departing from the scope and spirit of this invention, and it should be understood that this is not limited to the illustrative embodiments set forth herein.

What is claimed is:

1. An electric motor control device for controlling drive and regenerative operation of an electric motor, the electric motor control device comprising:
   an inverter circuit which converts DC power of a DC power supply into AC power; and
   a switching control section which performs on/off control of a semiconductor switching element composing the inverter circuit, wherein
   the switching control section includes:
      a power-supply-side abnormality determination section which determines whether a power-supply-side abnormal state is established in which regenerative energy from the electric motor cannot be regenerated to the DC power supply; and
      a switching frequency changeable section which changes, when the power-supply-side abnormality determination section has determined that the power-supply-side abnormal state has been established, a switching frequency of the semiconductor switching element such that an overall loss, which is a total of loss in the inverter circuit and loss in the electric motor, is increased.

2. The electric motor control device according to claim 1, wherein
   the switching control section includes a regenerative mode determination section which determines whether the electric motor is in a regenerative state, and
   when the power-supply-side abnormality determination section has determined that the power-supply-side abnormal state has been established and the regenerative mode determination section has determined that the regenerative state has been established, the switching frequency changeable section changes the switching frequency of the semiconductor switching element such that the overall loss, which is the total of the loss in the inverter circuit and the loss in the electric motor, is increased.

3. The electric motor control device according to claim 1, wherein
   when DC bus voltage of the inverter circuit has become greater than or equal to a predetermined value, the power-supply-side abnormality determination section determines that the power-supply-side abnormal state is established.

4. The electric motor control device according to claim 1, wherein
   the switching frequency changeable section previously stores, as a maximum loss switching frequency, a switching frequency that maximizes the overall loss within a range of switching frequencies that allow normal control of the electric motor and the inverter circuit, and changes the switching frequency of the semiconductor switching element to the maximum loss switching frequency, thereby to change the switching frequency such that the overall loss is increased.

5. The electric motor control device according to claim 4, wherein
   as the maximum loss switching frequency, a value set at least in accordance with a rotation speed of the electric motor is previously stored, and the switching frequency changeable section determines the maximum loss switching frequency at least in accordance with the rotation speed of the electric motor.

6. The electric motor control device according to claim 4, wherein as the maximum loss switching frequency, a value set at least in accordance with a current value of the electric motor is previously stored, and the switching frequency changeable section determines the maximum loss switching frequency at least in accordance with the current value of the electric motor.

7. The electric motor control device according to claim 4, wherein
as the maximum loss switching frequency, a value set at least in accordance with DC bus voltage of the inverter circuit is previously stored, and
the switching frequency changeable section determines the maximum loss switching frequency at least in accordance with the DC bus voltage of the inverter circuit.

8. The electric motor control device according to claim 1, wherein
the switching frequency changeable section calculates a lower limit value of the switching frequency that allows control of the electric motor based on a rotation speed of the electric motor, and changes the switching frequency to the lower limit value.

9. The electric motor control device according to claim 1, wherein
the switching frequency changeable section changes the switching frequency to an upper limit value of the switching frequency that allows normal control of the electric motor and the inverter circuit.

10. The electric motor control device according to claim 1, wherein
the switching element of the inverter circuit is formed from a wide band gap semiconductor.

* * * * *